(12) United States Patent
Yoshida et al.

(10) Patent No.: US 10,359,095 B2
(45) Date of Patent: Jul. 23, 2019

(54) TOOTHED BELT

(71) Applicant: Mitsuboshi Belting Ltd., Kobe-shi, Hyogo (JP)

(72) Inventors: Masakuni Yoshida, Hyogo (JP); Hirofumi Okabe, Hyogo (JP)

(73) Assignee: Mitsuboshi Belting Ltd., Kobe-shi, Hyogo (JP)

( * ) Notice: Subject to any disclaimer, the term of this patent is extended or adjusted under 35 U.S.C. 154(b) by 436 days.

(21) Appl. No.: 14/915,445

(22) PCT Filed: Aug. 28, 2014

(86) PCT No.: PCT/JP2014/072627
§ 371 (c)(1),
(2) Date: Feb. 29, 2016

(87) PCT Pub. No.: WO2015/030134
PCT Pub. Date: Mar. 5, 2015

(65) Prior Publication Data
US 2016/0208889 A1    Jul. 21, 2016

(30) Foreign Application Priority Data

Aug. 30, 2013 (JP) .................. 2013-179391
Aug. 8, 2014 (JP) .................. 2014-162892

(51) Int. Cl.
*F16G 1/28* (2006.01)
*B32B 5/02* (2006.01)
(Continued)

(52) U.S. Cl.
CPC .............. *F16G 1/28* (2013.01); *B29D 29/08* (2013.01); *B32B 3/28* (2013.01); *B32B 3/30* (2013.01);
(Continued)

(58) Field of Classification Search
CPC .. F16G 1/28; F16G 1/08; B29D 29/08; B32B 3/30; B32B 3/28; B32B 25/042;
(Continued)

(56) References Cited

U.S. PATENT DOCUMENTS 4,445,879 A * 5/1984 Cicognani ................. F16G 1/28
474/205
5,501,643 A   3/1996 Isshiki et al.
(Continued)

FOREIGN PATENT DOCUMENTS

CN    1107099 A    8/1995
CN  101099052 A    1/2008
(Continued)

OTHER PUBLICATIONS

EPO Translation of JP2004-245405 (Year: 2018).*
(Continued)

*Primary Examiner* — Frank J Vineis
*Assistant Examiner* — Michael Zhang
(74) *Attorney, Agent, or Firm* — Banner & Witcoff, Ltd.

(57) ABSTRACT

A toothed belt includes a plurality of tooth parts that are disposed at predetermined intervals along the longitudinal direction and contain a rubber composition (A) as a base material and a back side that has a cord embedded therein and contains a rubber composition (B) as a base material, in which the cord contains a Lang-twisted carbon fiber and is formed in a diameter of 1.1 mm or more and 2.5 mm or less and the rubber composition (B) constituting the back side has a hardness of from 80 degrees to 89 degrees in JIS-A hardness.

10 Claims, 5 Drawing Sheets

(51) Int. Cl.
  *B32B 3/28* (2006.01)
  *B32B 3/30* (2006.01)
  *B32B 25/04* (2006.01)
  *B32B 25/02* (2006.01)
  *F16G 1/08* (2006.01)
  *C08K 5/098* (2006.01)
  *B29D 29/08* (2006.01)
  *C08L 15/00* (2006.01)
  *B29K 307/04* (2006.01)
  *B29K 105/08* (2006.01)

(52) U.S. Cl.
  CPC .............. *B32B 5/02* (2013.01); *B32B 25/02* (2013.01); *B32B 25/042* (2013.01); *C08K 5/098* (2013.01); *C08L 15/005* (2013.01); *F16G 1/08* (2013.01); *B29K 2105/08* (2013.01); *B29K 2307/04* (2013.01); *B32B 2605/00* (2013.01)

(58) Field of Classification Search
  CPC ....... B32B 25/05; B32B 5/02; B32B 2605/00; C08K 5/098; C08K 5/09; C08K 7/02; B29K 2307/04; B29K 2105/08
  See application file for complete search history.

(56) References Cited

U.S. PATENT DOCUMENTS

| | | | |
|---|---|---|---|
| 5,584,771 A | 12/1996 | Isshiki et al. | |
| RE36,870 E | 9/2000 | Isshiki et al. | |
| 8,512,186 B2 | 8/2013 | Mitsutomi et al. | |
| 2007/0111834 A1* | 5/2007 | Matsuda .................. | F16G 1/28 474/202 |
| 2008/0032130 A1* | 2/2008 | Akiyama .................. | C08J 5/06 428/375 |
| 2009/0298632 A1 | 12/2009 | Shiriike et al. | |
| 2010/0167861 A1 | 7/2010 | Shiriike et al. | |
| 2011/0118068 A1* | 5/2011 | Mitsutomi ................ | F16G 1/10 474/205 |
| 2013/0059690 A1* | 3/2013 | Di Cesare ................ | F16G 1/08 474/205 |

FOREIGN PATENT DOCUMENTS

| | | |
|---|---|---|
| CN | 101099053 A | 1/2008 |
| CN | 102094936 A | 6/2011 |
| EP | 2711587 A1 | 3/2014 |
| JP | H03-4782 B2 | 1/1991 |
| JP | 2004-108576 A | 4/2004 |
| JP | 2004108576 A * | 4/2004 |
| JP | 2004-245405 A | 9/2004 |
| JP | 2004245405 A * | 9/2004 |
| JP | 2006-090338 A | 4/2006 |
| JP | 2011-122719 A | 6/2011 |
| JP | 2012-251586 A | 12/2012 |
| WO | 2012/161141 A1 | 11/2012 |

OTHER PUBLICATIONS

EPO Translation of JP 2004-108576 (Year: 2018).*
Sep. 26, 2017—(JP) Notification of Reasons for Refusal—Appeal 2017-2153 (App 2014-162892).
Dec. 26, 2017—(JP) Notification of Reasons for Refusal—App 2017-025347, Eng Tran.
Nov. 22, 2016—(JP) Final Rejection—App 2014-162892, Eng Tran.
Nov. 16, 2017—(CN) Notification of the Third Office Action—App 201480047939.1, Eng Tran.
Apr. 19, 2016—(JP) Notification of Reasons for Refusal—App 2014-162892, Eng Tran.
Apr. 3, 2017—(EP) Extended EP Search Report—App 14841029.3.
Sep. 29, 2016—(CN) Notification of First Office Action—App 201480047939.1, Eng Tran.
Jun. 2, 2017—(CN) Notification of the Second Office Action—App 201480047939.1, Eng Tran.
Sep. 22, 2014—International Search Report—International Application No. PCT/JP2014/072627.
Jun. 1, 2018—(CN) Notification of the Fourth Office Action—App 201480047939.1, Eng Tran.

* cited by examiner

[FIG. 1]
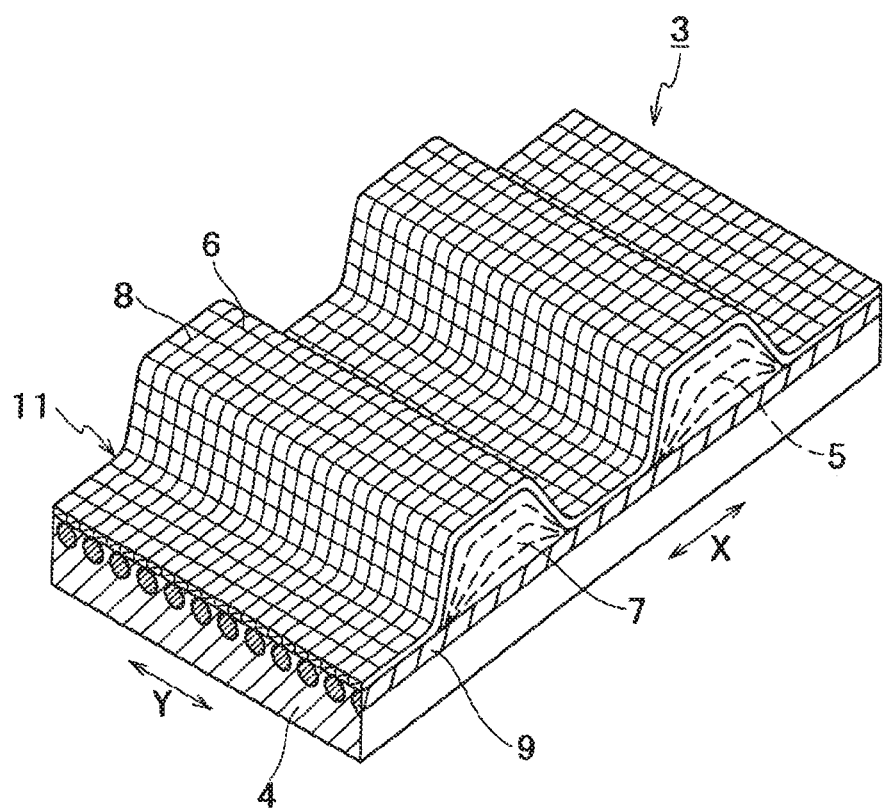

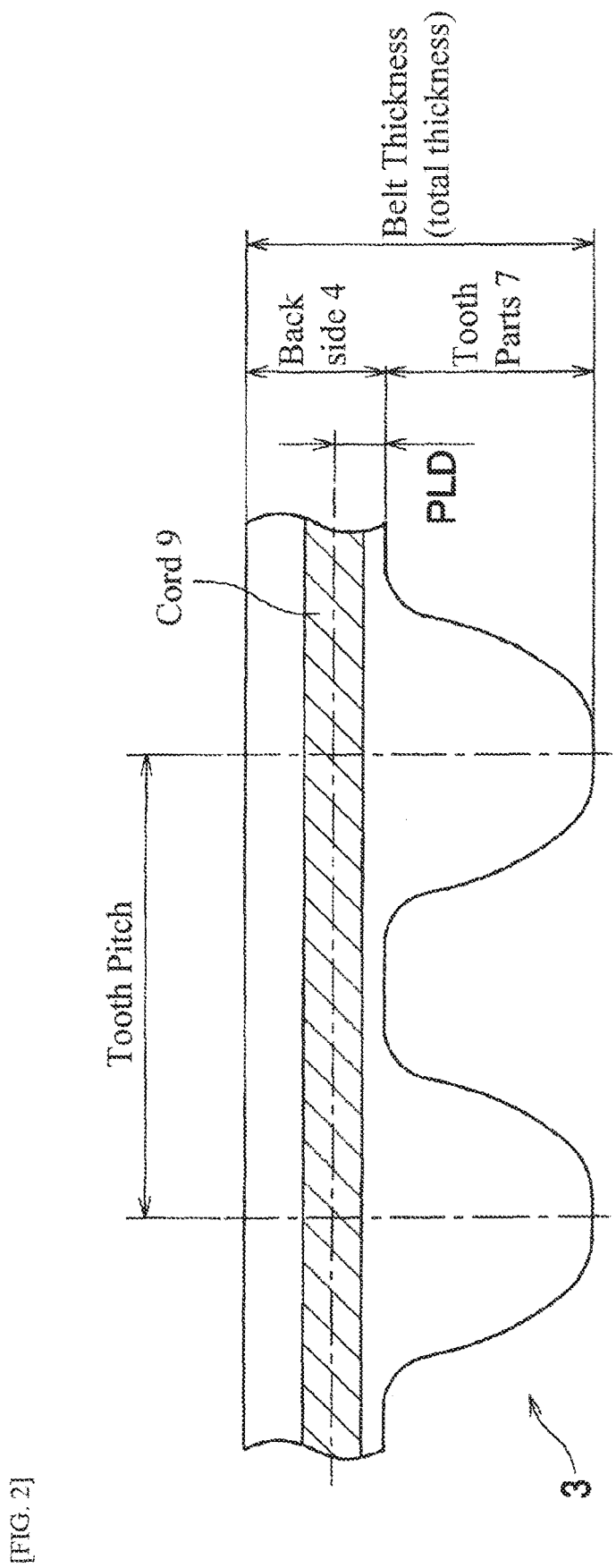
[FIG. 2]

[FIG. 3]
(a)
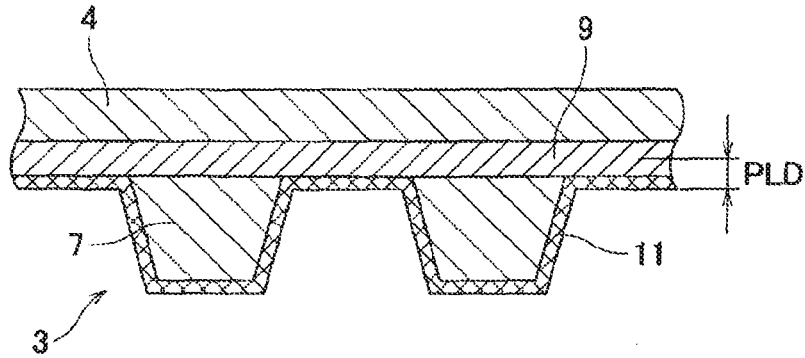
(b)
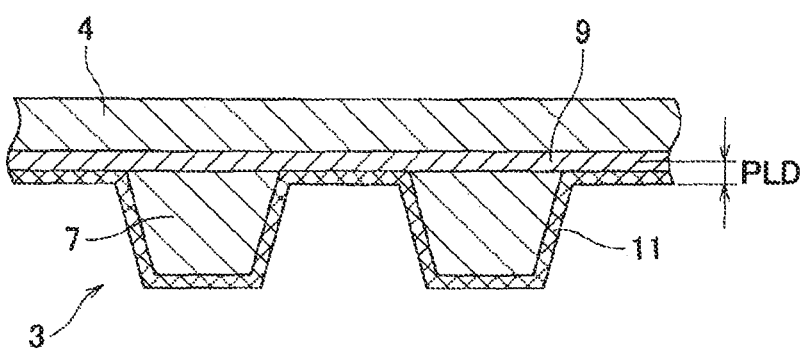
(c)
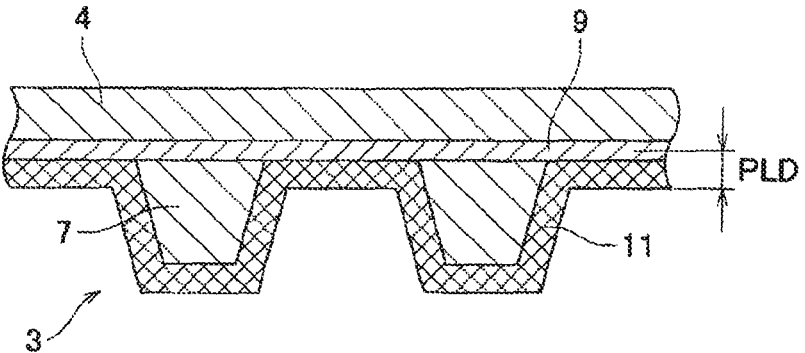

[FIG. 4]
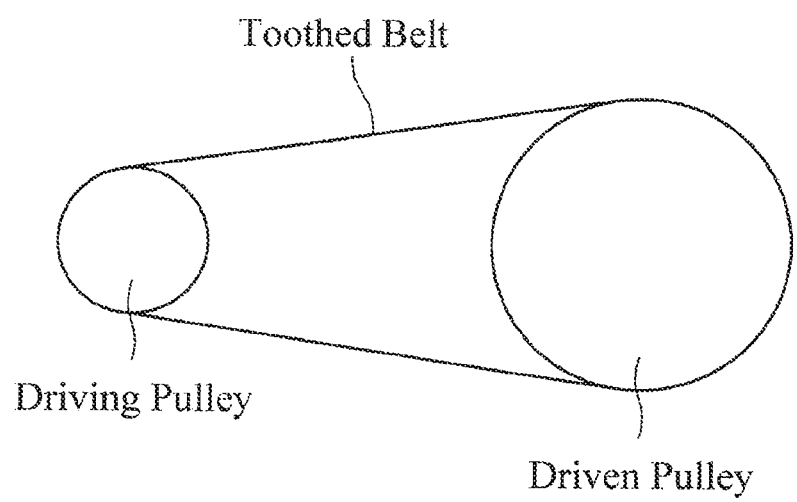

[FIG. 5]
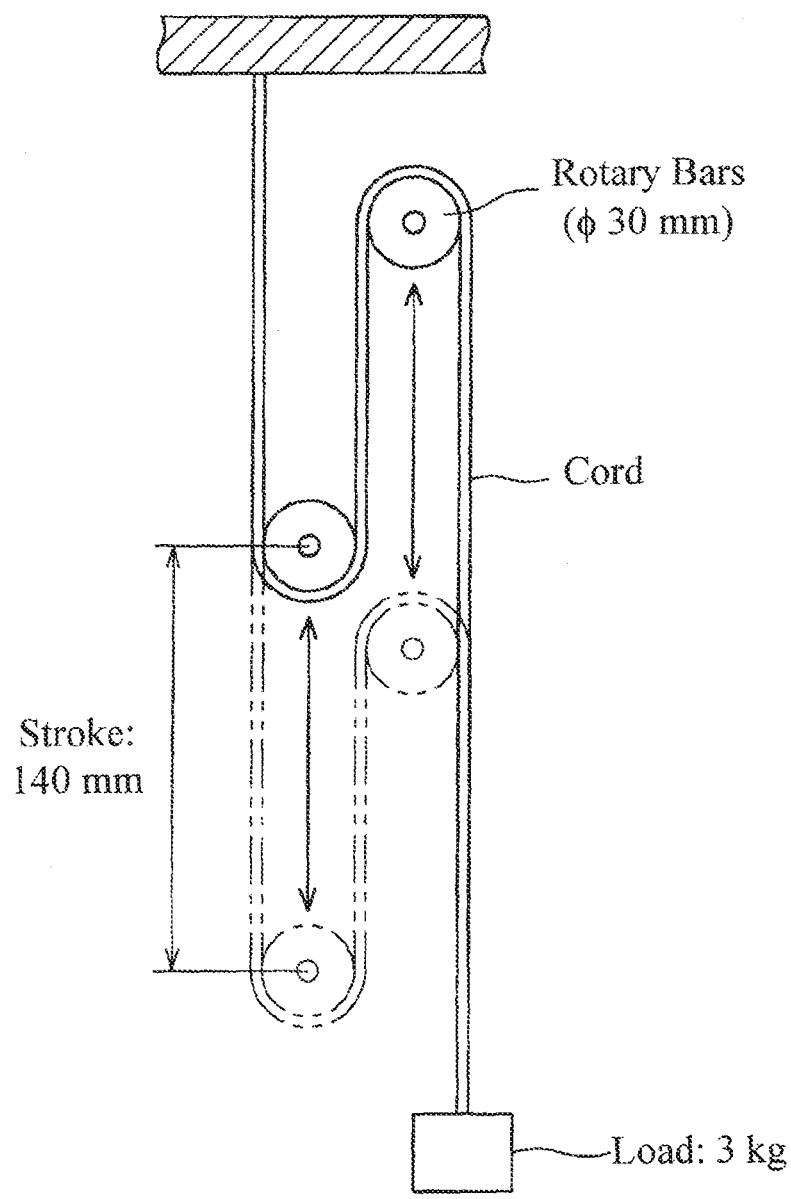

TOOTHED BELT

CROSS REFERENCE TO RELATED APPLICATIONS

This is a U.S. National Phase Application under 35 U.S.C. § 371 of International Application No. PCT/JP2014/072627, filed Aug. 28, 2014, which claims priority to Japanese Application Nos. 2013-179391 filed Aug. 30, 2013 and 2014-162892, filed Aug. 8 2014, the entire disclosures of which are incorporated herein by reference.

TECHNICAL FIELD

The present invention relates to a toothed belt to be used, for example, for synchronous transmission and the like of machines that are for general industrial purposes and transmit high load with a belt.

BACKGROUND ART

Durability is required for a toothed belt to be used in high-load transmission applications for rear wheel drive of motorcycles and the like.

Therefore, Patent Document 1 discloses a toothed belt which contains a tooth fabric using an ultrahigh molecular weight polyethylene fiber, a carbon fiber cord and a back side composed of a rubber composition having a JIS-A hardness of 87 degrees or more, prevents damages of the tooth fabric and tooth parts, and affords excellent durability in high-load transmission applications. Moreover, Patent Document 2 discloses a toothed belt which contains a tooth fabric using a polytetrafluoroethylene (PTFE) fiber, a carbon fiber cord and a back side composed of a rubber composition having a JIS-A hardness of 85 degree or more, and affords excellent durability in high-load transmission applications. In addition, Patent Document 3 discloses a toothed belt which contains a cord of a Lang-twisted carbon fiber having a particular twist factor and improves bending fatigue resistance.

However, although the toothed belts of Patent Documents 1 and 2 use a carbon fiber cord having excellent bendability, its twist structure is limited to single-twisted one or plied one, and bending rigidity thereof is high as compared to Lang-twisted one. Also, the JIS-A hardness of the rubber composition constituting the back side is set to such high hardness as 85 degrees or more or 87 degrees or more. Accordingly, the toothed belts of Patent Documents 1 and 2 have problems that flexibility of the entire belt is impaired, a sufficient bending fatigue resistance is not obtained, and severance of the belt is caused due to back side cracking.

On the other hand, although the toothed belt of Patent Document 3 achieves a certain flexural fatigue resistance, the cord diameter is as thin as about 1.0 mm, so that the use is limited to applications in which belt effective tension is up to about 3,500 N (e.g., OHC drive of automobiles, etc.). That is, when the toothed belt of Patent Document 3 is used under high-load conditions, failure with tooth crack occurs due to elongation of the belt since the cord diameter is small. Therefore, the toothed belt of Patent Document 3 cannot be used in high-load transmission applications, such as rear wheel drive of a motorcycle in which effective tension imparted to the belt is from 4,000 to 10,000 N. Furthermore, in dimension design of the belt, the tooth pitch of the belt and the PLD (Pitch Line Differential: distance from the bottom of the belt tooth to the center of the cord) are usually designed so as to coincide with the tooth pitch of a pulley, in consideration of the size of the pulley. In a large tooth form having such a tooth pitch as 14 mm, when the cord diameter is small as in the case of the toothed belt of Patent Document 3, the distance from the bottom of the belt tooth to the center of the cord becomes short and thus proper PLD that matches a pulley cannot be obtained. Then, there arises a problem that the tooth pitch of the belt does not coincide with the tooth pitch of the pulley. When the belt is used in such a state under a high-load condition, since there is a difference in the tooth pitches between the pulley and the belt, abnormal wear occurs on the pressure surface and tooth bottom surface of the belt and, as a result, there arise problems such as tooth crack and severance. Moreover, abnormal noise is generated due to large belt swing to the pulley diameter direction at the time of belt engagement. On the other hand, even in the case where the cord diameter is small, PLD can be increased by thickening the tooth fabric but the rubber content is decreased by an increase of the tooth fabric, so that tooth crack resistance is lowered.

PRIOR ART DOCUMENT

Patent Document

Patent Document 1: JP-A-2004-245405
Patent Document 2: JP-A-2006-90338
Patent Document 3: JP-A-H03-4782

SUMMARY OF THE INVENTION

Problems that the Invention is to Solve

The present invention is made for solving the aforementioned problems, and an object thereof is to provide a highly durable toothed belt that exhibits excellent bending fatigue resistance even under high-load conditions.

Means for Solving the Problems

In order to solve the above problems, the toothed belt of the present invention is a toothed belt containing a plurality of tooth parts that are disposed at predetermined intervals along the longitudinal direction and contain a rubber composition (A) as a base material, and a back side that has a cord embedded therein and contains a rubber composition (B) as a base material, in which the cord contains a Lang-twisted carbon fiber and is formed in a diameter of 1.1 mm or more and 2.5 mm or less and the rubber composition (B) constituting the back side has a hardness of from 80 degrees to 89 degrees in JIS-A hardness.

According to the configuration of the toothed belt of the present invention, since the cord is configured by Lang twist, bending rigidity is lowered as compared to the cases of plied or single-twisted one. Furthermore, since the cord is formed from a carbon fiber, it is possible to prevent the tooth crack (missing of the tooth part) due to an increase in elongation of the cord, under high-load conditions. In addition, since the cord diameter is controlled to 1.1 mm or more and 2.5 mm or less, a good running residual strength can be achieved under high-load conditions. That is, since the cord diameter is controlled to 1.1 mm or more, a proper PLD is obtained and also it is possible to prevent the tooth crack due to an increase in elongation of the cord. Moreover, since the cord diameter is controlled to 2.5 mm or less, it is possible to prevent the generation of cord severance due to a decrease in bending fatigue resistance of the cord. In addition, since the hardness of the rubber constituting the back side is controlled to from 80 degrees to 89 degrees in JIS-A hardness, an excellent bending fatigue resistance can be achieved under high-load conditions. That is, since the rubber constituting the back side is configured so as to have a hardness of 80 degrees or more, it is possible to prevent the possibility of crack generation due to collision of a foreign matter and also, since it is configured so as to be 89 degrees or less, bending rigidity is lowered, the flexibility of the entire belt is improved, and the belt severance due to back side cracks can be prevented. Thus, it is possible to realize a highly durable toothed belt that exhibits an excellent bending fatigue resistance even under high-load conditions.

Here, the cord diameter means a cord diameter of a twisted cord (carbon fiber cord) formed in Lang twist using a carbon fiber. Moreover, Lang twist is one in which one or two or more pieces of a fiber are arranged and twisted (primary twist) and two or more pieces of the resulting one are arranged and twisted in the same direction as the direction in the primary twist (final twist). Furthermore, the single twist is one in which one or several pieces of a fiber are arranged and twisted (primary twist). In addition, ply twist is one in which one or two or more pieces of a fiber are arranged and twisted (primary twist) and two or more pieces of the resulting one are arranged and twisted in the reverse direction to the direction in the primary twist (final twist).

In the toothed belt, it is preferred that the rubber composition (A) constituting the tooth parts has a hardness of from 92 degrees to 96 degrees in JIS-A hardness.

Since the rubber constituting the tooth parts is controlled to have a hardness of from 92 degrees to 96 degrees in JIS-A hardness, an excellent running residual strength can be obtained under high-load conditions. That is, since the rubber constituting the tooth parts is configured so as to have a hardness of 92 degrees or more in JIS-A hardness, the generation of the tooth crack due to deformation of the tooth parts is prevented and also, since it is configured so as to be 96 degrees or less, the difference in hardness with the rubber composition of the back side is reduced to improve a balance of the entire belt and thus, it is possible to prevent an easy crack generation due to stress concentration resulting from a strain that may occur at the interface between the back side and the tooth parts.

In the toothed belt, it is preferred that a difference between the hardness of the rubber composition (A) constituting the tooth parts and the hardness of the rubber composition (B) constituting the back side is from 7 degrees to 16 degrees in JIS-A hardness.

The difference in hardness between the rubber compositions of the tooth parts and the back side may be reduced to improve the balance of the entire belt and thus, it is possible to prevent an easy crack generation due to stress concentration resulting from a strain that may occur at the interface between the back side and the tooth parts.

In the toothed belt, it is preferred that both of the rubber composition (A) constituting the tooth parts and the rubber composition (B) constituting the back side contain a hydrogenated acrylonitrile-butadiene rubber (H-NBR) and a hydrogenated acrylonitrile-butadiene rubber containing an unsaturated carboxylic acid metal salt (unsaturated carboxylic acid metal salt-containing H-NBR).

For both of the rubber composition (A) constituting the tooth parts and the rubber composition (B) constituting the back side, the hardness of the rubber composition can be adjusted by changing the mixing ratio of the hydrogenated acrylonitrile-butadiene rubber to the unsaturated carboxylic acid metal salt-containing hydrogenated acrylonitrile-butadiene rubber.

In the toothed belt, it is preferred that the rubber composition (B) constituting the back side contains the hydrogenated acrylonitrile-butadiene rubber and the unsaturated carboxylic acid metal salt-containing hydrogenated acrylonitrile-butadiene rubber in a mass ratio of from 40:60 to 100:0.

The hardness of the rubber composition can be adjusted by changing the mixing ratio of the hydrogenated acrylonitrile-butadiene rubber to the unsaturated carboxylic acid metal salt-containing hydrogenated acrylonitrile-butadiene rubber. Furthermore, since the back side is formed of a rubber composition in which the hydrogenated acrylonitrile-butadiene rubber and the unsaturated carboxylic acid metal salt-containing hydrogenated acrylonitrile-butadiene rubber are mixed in a mass ratio of from 40:60 to 100:0, the hardness can be controlled to from 80 degrees to 89 degrees.

In the toothed belt, it is preferred that the rubber composition (A) constituting the tooth parts contains the hydrogenated acrylonitrile-butadiene rubber and the unsaturated carboxylic acid metal salt-containing hydrogenated acrylonitrile-butadiene rubber in a mass ratio of from 50:50 to 0:100.

The hardness of the rubber composition can be adjusted by changing the mixing ratio of the hydrogenated acrylonitrile-butadiene rubber to the unsaturated carboxylic acid metal salt-containing hydrogenated acrylonitrile-butadiene rubber. Furthermore, since the tooth parts are formed of a rubber composition in which the hydrogenated acrylonitrile-butadiene rubber and the unsaturated carboxylic acid metal salt-containing hydrogenated acrylonitrile-butadiene rubber are mixed in a mass ratio of from 50:50 to 0:100, the hardness can be controlled to from 92 degrees to 96 degrees.

In the toothed belt, it is preferred that the rubber composition (A) constituting the tooth parts contains a short fiber in an amount of from 3 to 7 parts by mass based on 100 parts by mass of the total amount of the rubber component containing the hydrogenated acrylonitrile-butadiene rubber and the unsaturated carboxylic acid metal salt-containing hydrogenated acrylonitrile-butadiene rubber.

According to the above configuration, the modulus of the tooth parts in the longitudinal direction of the toothed belt can be increased and the engagement of the tooth parts with the toothed pulley can be maintained even at high-load running.

In the toothed belt, it is preferred that the tooth parts have a tooth pitch of from 8 mm to 14 mm.

Even in the case of a large tooth form having a tooth pitch of from 8 mm to 14 mm, since the cord diameter is configured so as to be from 1.1 mm to 2.5 mm, a proper PLD can be achieved without thickening the tooth fabric and thus it is possible to prevent the generation of the tooth crack due to an increase of tooth fabric and a decrease of rubber.

Advantageous Effect of the Invention

As mentioned in the above description, according to the present invention, it is possible to provide a highly durable toothed belt that exhibits an excellent bending fatigue resistance even under high-load conditions.

BRIEF DESCRIPTION OF DRAWINGS

FIG. 1 is a cross-sectional perspective view of the toothed belt according to an embodiment of the present invention.

FIG. 2 is a cross-sectional view of the toothed belt according to an embodiment of the present invention and is a figure illustrating a relationship between the cord and PLD.

(a) to (c) of FIG. 3 are cross-sectional views of toothed belts and are drawings illustrating relationships between the cord and PLD in the cases where the cord diameter and the thickness of the tooth fabric are changed.

FIG. 4 is a drawing illustrating an outline of a running test apparatus for the toothed belt according to an embodiment of the present invention.

FIG. 5 is a drawing illustrating an outline of a tensile test apparatus of the cord of the toothed belt according to an embodiment of the present invention.

MODE FOR CARRYING OUT THE INVENTION

The following will describe embodiments of the present invention with reference to drawings.

As illustrated in FIG. 1 and FIG. 2, the toothed belt 3 of the present embodiment is constituted by a plurality of tooth parts 7 which are disposed at predetermined intervals along the belt longitudinal direction (X direction) and whose surface is covered with a tooth fabric 11, and a back side 4 in which a plurality of cords 9 are embedded.

In the back side 4, a plurality of cords 9 extending in the belt longitudinal direction are embedded side by side in the belt width direction (Y direction). The cord 9 is formed of a Lang-twisted carbon fiber cord. Since the cord 9 is formed by Lang twist, the bending rigidity is lowered as compared to the cases of plied one or single-twisted one and an excellent bending fatigue resistance can be achieved. As the carbon fiber, for example, trade name "TORAYCA" manufactured by Toray Industries, Inc., or the like can be used. The Lang-twisted carbon fiber cord can be formed in the following manner. First, a multifilament carbon fiber having a total denier number of from 1,000 to 10,000 is impregnated and attached to a treating solution obtained by dissolving a rubber latex and an epoxy resin into a solvent such as toluene. Then, the treated carbon fiber is subjected to a primary twist in the S or Z direction at a primary twist factor of from 0.65 to 1.61, and from 2 to 4 pieces of the treated carbon fiber subjected to the primary twist are collected and further subjected to final twist to the same direction as in the primary twist at a final twist factor of from 1.14 to 3.61. Thus, the Lang-twisted carbon fiber cord can be obtained. Here, the twist factor TF is represented by TF=√D×T/28.7 (D: total denier number of code, T: twist frequency per 1 cm).

The rubber latex in the treating solution for use in the production of the Lang-twisted carbon fiber cord is preferably composed of a rubber composition of the same type as the rubber composition constituting the back side 4 and the tooth parts 7. As the epoxy resin, use can be made of one or two or more kinds of ethylene glycol diglycidyl ether, glycerol polyglycidyl ether, trimethylolpropane polyglycidyl ether, sorbitol polyglycidyl ether, hexanediol diglycidyl ether, and the like.

The cord 9 has a cord diameter of preferably 1.1 mm or more and 2.5 mm or less. In the case where the cord diameter is less than 1.1 mm, tooth crack (missing of the tooth parts) is likely to occur due to an increase in the elongation of the cord 9. In the case where the cord diameter exceeds 2.5 mm, the cord severance tends to occur due to a decrease in the bending fatigue resistance of the cord 9. Furthermore, the PLD of the toothed belt 3 is determined by the relation between the thickness of the tooth fabric 11 and the cord diameter of the cord 9 as illustrated in (a) of FIG. 3. Therefore, in the case where the cord diameter is less than 1.1 mm, only a small PLD can be set as illustrated in (b) of FIG. 3 and it is difficult to obtain a proper PLD. Moreover, even in the case where the cord diameter is small, a large PLD can be attained if the tooth fabric is thickened as illustrated in (c) of FIG. 3, but the volume of rubber of the tooth parts 7 decreases and, as a result, tooth crack resistance decreases. The lower limit of the cord diameter of the cord 9 is preferably 1.2 mm or more, and the upper limit is preferably 2.4 mm or less, more preferably 2.1 mm or less, and particularly preferably 1.8 mm or less.

The back side 4 is composed of a rubber composition having a hardness in JIS-A hardness of 80 degrees or more and 89 degrees or less. Here, the JIS-A hardness is a hardness in accordance with JISK6253 (2012) and is a hardness of the surface of the back side 4 of the toothed belt 3, which is measured by using a type A durometer. Since the JIS-A hardness of the back side 4 is controlled to 80 degrees or more and 89 degrees or less, the bending rigidity of the back side 4 is lowered and an excellent bending fatigue resistance can be achieved. In the case where the back side 4 has the JIS-A hardness of less than 80 degrees, there is a possibility that cracks are generated in the back side 4 due to the collision of foreign matters or the like. In the case where the back side 4 has the JIS-A hardness exceeding 89 degrees, the bending fatigue resistance decreases and cracks are easily generated in the back side 4.

For the rubber composition constituting the back side 4 (rubber composition (B), hereinafter referred to as "back side rubber"), preferably used is a mixture of H-NBR and an unsaturated carboxylic acid metal salt-containing H-NBR and the adjustment of the hardness can be achieved by changing the mixing ratio of both. Specifically, in order to obtain a hardness of 80 degrees or more and 89 degrees or less, they are preferably mixed while setting the mass ratio of "H-NBR":"Unsaturated carboxylic acid metal salt-containing H-NBR" to from 40:60 to 100:0. As the unsaturated carboxylic acid metal salt-containing H-NBR, for example, use can be made of one in which zinc methacrylate that is an unsaturated carboxylic acid metal salt is highly finely dispersed in H-NBR (e.g., trade name "ZSC" manufactured by Zeon Corporation, etc.).

H-NBR is one in which, while maintaining oil resistance that is an advantage of conventional acrylonitrile-butadiene rubber, in order to prevent aging of the rubber elasticity due to the recombination reaction of sulfur during heat aging, unsaturated bonds (carbon-carbon double bonds) possessed by the conventional acrylonitrile-butadiene rubber is chemically hydrogenated to make the recombination reaction during heat aging less likely to occur, thereby improving the heat resistance. The unsaturated carboxylic acid metal salt is one in which an unsaturated carboxylic acid having one or two or more carboxyl groups and a metal are ionically bonded. Examples of the unsaturated carboxylic acid include monocarboxylic acids such as acrylic acid and methacrylic acid, dicarboxylic acids such as maleic acid, fumaric acid, and itaconic acid. Furthermore, examples of the metal include magnesium, titanium, iron, copper, zinc, aluminum, lead, and nickel.

H-NBR for use in the present invention is an unsaturated rubber having an iodine value ranging from 7 to 30 mg/100 mg, preferably from 11 to 28 mg/100 mg. Here, the unsaturated rubber means a rubber having an unsaturated bond formed of a carbon-carbon double bond (C=C bond) in the polymer molecular chain. Moreover, the iodine value is an index representing the amount of the unsaturated bond and a higher iodine value indicates a larger amount of the unsaturated bond contained in the polymer molecular chain. As a method of measuring the iodine value, it can be determined by adding excess iodine to a measurement sample to achieve complete reaction (reaction between iodine and the unsaturated bond) and quantitatively determining the amount of remaining iodine by oxidation-reduction titration. In the case where H-NBR has the iodine value of less than 7 mg/100 mg, the crosslinking reaction among H-NBR's is insufficient and the rigidity of the tooth part becomes low, so that there is a concern that troubles such as tooth crack occur during belt running. On the other hand, in the case where H-NBR has the iodine value of more than 30 mg/100 mg, the amount of the unsaturated bond exceedingly increases, so that a decrease in heat resistance and deterioration due to oxidation proceed in the tooth part and there is a concern that the belt life is shortened.

The tooth parts 7 are composed of a rubber composition having a hardness in JIS-A hardness of 92 degrees or more and 96 degrees or less. Here, the JIS-A hardness is a hardness in accordance with JISK6253 (2012) and is a hardness of the side surface of the tooth part 7 of the toothed belt 7, which is measured by using a type A durometer. In the case where the tooth part 7 has the JIS-A hardness of less than 92 degrees, tooth crack owing to the deformation of the tooth part 7 is likely to occur. In the case where the tooth part 7 has the JIS-A hardness exceeding 96 degrees and there is too much difference with the hardness of the back side 4, strain is generated and cracking (crack) is likely to occur at the interface between the back side 4 and the tooth parts 7. It is preferable that the hardness difference between the back side 4 and the tooth parts 7 is from 7 to 16 in JIS-A hardness as a guide. In the case where the hardness difference between the back side 4 and the tooth parts 7 is too large, a balance of the entire toothed belt 3 becomes worse and, as a result, at the interface of the back side 4 and the tooth part 7, cracking (crack) due to stress concentration is likely to occur. Contrarily, in the case where the hardness difference between the back side 4 and the tooth parts 7 is too small, the effect resulting from the hardness difference becomes insufficient.

For the rubber composition constituting the tooth parts 7 (rubber composition (A), hereinafter referred to as "tooth part rubber"), preferably used is a mixture of H-NBR and unsaturated carboxylic acid metal salt-containing H-NBR as in the case of the back side 4, and the adjustment of the hardness can be achieved by changing the mixing ratio of both. Specifically, in order to obtain the hardness of 92 degrees or more and 96 degrees or less, they are preferably mixed while setting the mass ratio of "H-NBR":"Unsaturated carboxylic acid metal salt-containing H-NBR" to from 50:50 to 0:100.

Furthermore, in the rubber composition constituting the tooth parts 7, a short fiber 5 of an aromatic polyamide or the like is preferably embedded. The short fiber 5 is preferably embedded so as to be aligned along the outer shape of the tooth part 7 at the side near to the tooth fabric 11 and so as to be aligned almost in parallel with the cord 9 as the short fiber approaches the cord 9. The amount of the short fiber 5 to be blended is from 3 to 7 parts by mass based on 100 parts by mass of the total amount of the rubber component containing H-NBR and unsaturated carboxylic acid metal salt-containing H-NBR. In the case where the blending amount of the short fiber 5 is less than 3 parts by mass based on 100 parts by mass of the total amount of the rubber component, since the storage elastic modulus (E') of the rubber composition constituting the tooth parts 7 is low, the amount of deformation of the tooth parts 7 increases under high-load running conditions and there is a concern that tooth crack occurs. In the case where the blending amount of the short fiber 5 exceeds 7 parts by mass based on 100 parts by mass of the total amount of the rubber component, since E' of the rubber composition constituting the tooth parts 7 becomes excessively high, the tooth part 7 is hardly deformed and adjustment of the engaging position by deformation cannot be achieved, so that there is a concern that damage to the tooth parts 7 increases. Since the blending amount of short fiber 5 is controlled to from 3 to 7 parts by mass based on 100 parts by mass of the total amount of the rubber component, the modulus of the tooth parts 7 in the longitudinal direction of the toothed belt 3 can be enhanced. Thus, the modulus of the toothed belt 3 increases and hence the engagement of the tooth parts 7 with a toothed pulley can be maintained even under high-load running. The kind of the short fiber 5 is not particularly limited and, for example, a fiber having a high modulus, such as an aramid fiber, a PBO (polyparaphenylene-benzobisoxazole) fiber, a polyvinyl alcohol fiber, or a carbon fiber can be preferably used.

In the rubber composition constituting the tooth parts 7, a powdery inorganic filler is preferably blended in an amount of 10 parts by mass or less based on 100 parts by mass of the total amount of the rubber component containing H-NBR and unsaturated carboxylic acid metal salt-containing H-NBR. In the case where the blending amount of the powdery inorganic filler exceeds 10 parts by mass based on 100 parts by mass of the total amount of the rubber component, the heat generation of the rubber composition constituting the tooth parts 7 increases and the heat resistance of the rubber composition decreases, so that there is a concern that tooth crack and cracking occur due to heat aging.

In the present embodiment, it is not always necessary to blend a powdery inorganic filler such as carbon black or silica in the rubber composition constituting the tooth parts 7. In particular, it is sufficient to blend carbon black such an extent that it can color the rubber composition constituting the tooth parts 7 black. Preferably, the amount is 10 parts by mass or less based on 100 parts by mass of the total amount of the rubber component containing H-NBR and unsaturated carboxylic acid metal salt-containing H-NBR. More preferably, it is 5 parts by mass or less. The carbon black is used as a colorant, and carbon black is most suitable for coloring the rubber composition black.

Moreover, the tooth parts 7 are preferably formed so as to have a tooth pitch (intervals between tooth and tooth in the longitudinal direction (X direction) of the belt; see FIG. 2) of 8 mm or more and 14 mm or less. Even in the case of a large tooth form having a tooth pitch of from 8 mm to 14 mm, in the present embodiment, since the cord 9 is configured so as to have a cord diameter of from 1.1 mm to 2.5 mm, a proper PLD can be achieved without thickening the tooth fabric 11, so that it is possible to prevent the occurrence of tooth crack due to an increase of the tooth fabric 11 and the decrease of the rubber of the tooth part 7.

Furthermore, it is preferred that the vulcanized product of the rubber composition used in the tooth parts 7 of the present embodiment has E' of from 200 to 300 MPa under an atmospheric temperature of 70° C. as measured according to JIS K6394 (2007) and a loss factor (Tan δ) ranging from 0.1 to 0.2. Within these ranges, troubles such as tooth crack are less likely to occur and the deformation of the tooth parts 7 is prevented, so that the engagement with the toothed pulley is not disturbed and the durability is improved.

E' is an elastic modulus obtained from a test in a dynamic state in which periodic vibration is imparted, and is defined as a proportion of elastic stress of the same phase as strain. Since an object becomes less likely to deform as E' increases, the amount of deformation decreases even with strong external force, such as high-load conditions, so that cracking, severance, and the like are less likely to occur. On the other hand, an object is easily deformed as E' decreases, severance and fracture of the object easily occur even with a small external force.

Tan δ is one obtained by dividing a loss modulus (E") by E' and is a measure of the ratio of the energy dissipated as heat during one vibration cycle to the maximum energy stored. That is, Tan δ represents easiness of dissipation of the vibration energy applied to the rubber composition, as heat. Since much more energy applied from the outside is converted into heat as Tan δ increases, the temperature of the rubber composition is raised by self heat generation, and thus the heat resistance decreases. On the other hand, since the amount of heat generation is suppressed low as Tan δ decreases, the heat resistance of the rubber composition is improved.

The tooth fabric 11 has a fiber-woven fabric made by weaving a warp yarn 6 extending to the belt width direction and a weft yarn 8 extending to the belt longitudinal direction as a base material. In addition, the fiber-woven fabric is formed of a flat woven fabric, a twilled fabric, a satin fabric, or the like. As a fiber material constituting the fiber-woven fabric, for example, use can be made of an aramid fiber, a urethane elastic yarn, an aliphatic fiber (nylon 6, nylon 66, polyester, polyvinyl alcohol, etc.), or the like. Incidentally, the tooth fabric 11 may not be provided.

As the fiber-woven fabric of the present embodiment, there can also be adopted one having a multiple woven (double woven) structure obtained by weaving two kinds of wefts 8 and one kind of a warp 6. In this case, it is preferable to use a nylon fiber as the warp 6 and a fluorine-based fiber, a nylon fiber, and a urethane elastic yarn as the wefts 8. Also, it is preferable to use a fluorine-based fiber (e.g., PTFE fiber) having a low friction coefficient as the weft 8 located (exposed) on the surface side (engagement side with the toothed pulley) of the tooth fabric 11 among the wefts 8, in order to reduce the friction between the tooth fabric 11 and the toothed pulley. On the other hand, by using a fiber other than the fluorine-based fiber (a nylon fiber or a urethane elastic yarn) as the weft yarn 8 located on the rear surface side (adhesion side to the tooth parts 7) of the tooth fabric 11, it is possible to enhance the adhesive force between the tooth fabric 11 and the rubber constituting the tooth parts 7.

Around the fluorine-based fiber, it is preferable to dispose a low-melting-point fiber having such a melting point that it melts at the vulcanization temperature of the tooth parts 7 and back side 4 having a rubber as the base material. Specifically, there include embodiments that the fluorine-based fiber and the low-melting-point fiber are mixed and twisted or the fluorine-based fiber is covered with the low-melting-point fiber. Incidentally, the vulcanization conditions (vulcanization temperature and vulcanization time) of the tooth parts 7 and the back side 4 are not particularly limited and, in consideration of the kinds of a vulcanizing agent and a vulcanization accelerator, a vulcanization means, and the like, the conditions are usually determined with reference to a vulcanization curve measured by using a Mooney viscometer or the other vulcanization behavior-measuring machine. General vulcanization conditions to be determined in this way are a vulcanizing temperature of about 100 to 200° C. and a vulcanization time of about 1 minute to 5 hours. Secondary vulcanization may be performed, if necessary.

In this case, the low-melting-point fiber melts at the time of the vulcanization of the tooth parts 7 and the back side 4 and flows into the fibers constituting the tooth fabric 11, and the low-melting fiber is crystallized by cooling to the melting point or lower. Therefore, it can be suppressed the severance and scattering of the fluorine-based fiber caused by the impact and abrasion that are generated on the surface of the tooth fabric 11 at the time of engaging with the toothed pulley or at the time of pulling out from the toothed pulley. Thereby, the tooth parts 7 and the back side 4 can be protected for a longer period of time to prevent the tooth crack of the belt and thus it becomes possible to extend the life at the time of high-load running.

Here, as the low-melting-point fiber, use can be made of, for example, a polyamide-based fiber, a polyester-based fiber, or an olefin-based fiber, having a melting point of preferably lower than 165° C. and more preferably lower than 150° C.

Examples of the polyamide-based fiber usable as the low-melting-point fiber includes copolymerized polyamides composed of a combination of a W-aminocarboxylic acid component or a dicarboxylic component and a diamine.

As the polyester-based fiber usable as the low-melting-point fiber, preferred is a core-sheath type composite fiber composed of a polyester-based polymer of a core component having a melting point higher than the vulcanization temperature of the tooth parts 7 and the back side 4 and a copolymerized polyester-based polymer of a sheath component having a melting point lower than the vulcanization temperature of the tooth parts 7 and the back side 4. Examples of the polyester-based polymer of the core component having a melting point higher than the vulcanization temperature of the tooth parts 7 and the back side 4 include polyethylene terephthalate, polybutylene terephthalate, and copolymers thereof. The copolymerized polyester-based polymer of the sheath component having a melting point lower than the vulcanization temperature of the tooth parts 7 and the back side 4 can be obtained by the polycondensation reaction of a dibasic acid and a diol, and examples thereof include terephthalic acid and diethylene glycol as base materials and, isophthalic acid, adipic acid, sebacic acid, butanediol, hexanediol, polyethylene glycol, neopentyl glycol, and the like as copolymerizable components. It is possible to adjust the melting point by a combination thereof and a copolymerization ratio.

Examples of the olefin-based fiber usable as the low-melting-point fiber include polypropylene fibers, polyethylene fibers (e.g., high-density polyethylene fibers, medium-density polyethylene fibers, low-density polyethylene fibers, linear low-density polyethylene fibers, ultrahigh molecular weight polyethylene fibers), and the like.

Also, those obtained by copolymerizing them may be used and further, the twisting method and configuration are not particularly limited as long as the fiber melts at the vulcanization temperature of the tooth parts 7 and the back side 4. Furthermore, the surface of these low-melting-point fibers may be subjected to a plasma treatment or the like for the purpose of improving the affinity with an adhesion-treating agent.

The tooth fabric 11 is adhered to the rubber constituting the tooth part 7, for example, through a series of adhesion treatments including the following steps.

(1) A fiber-woven fabric constituting the tooth fabric 11 is impregnated with a resorcin-formalin-rubber latex treating liquid (hereinafter referred to as RFL treating liquid), followed by drying.

Here, to the RFL treating liquid is preferably added at least one vulcanization aid among an aqueous dispersion of a sulfur compound, a quinone oxime-based compound, a methacrylate-based compound, and a maleimide-based compound or one obtained by dispersing any of these vulcanization aids in water.

As the aqueous dispersion of a sulfur compound, for example, an aqueous dispersion of sulfur, tetramethylthiuram disulfide, or the like may be employed. As the quinone oxime-based compound, for example, p-quinone dioxime or the like may be employed. As the methacrylate-based compound, for example, ethylene glycol dimethacrylate, trimethylolpropane trimethacrylate, or the like may be employed. As the maleimide-based compound, for example, N,N'-m-phenylenebismaleimide, N,N'-(4,4'-diphenylmethanebismaleimide), or the like may be employed.

Incidentally, "water" in the above-mentioned "one obtained by dispersing any of these vulcanization aids in water" may be, for example, one containing a little amount of an alcohol such as methanol. According to this, even in the case where "the vulcanizing aid" is insoluble in water, the affinity of "the vulcanizing aid" to water is improved and "the vulcanizing aid" is easily dispersed.

The following effects are expected by the addition of the vulcanization aid to the RFL treating liquid. That is, chemical bonding force between the layers of the rubber latex component contained in the RFL treating liquid and an outer layer rubber (it means a rubber cement or a rolled rubber used in the rubber cement treatment of (2) or the coat treatment of (3) to be described later; in the case where the coat treatment is omitted, it means the rubber constituting the tooth parts 7) are strengthened and thereby, the adhesion is improved and the exfoliation of the tooth fabric 11 is suppressed. As an effect to be further expected, the chemical bonding force (force of crosslinking) of the rubber latex component itself contained in the RFL treating liquid is strengthened and, as a result, it is considered that the exfoliation owing to the destruction of the outer layer rubber that is a target to be adhered precedes the exfoliation owing to cohesive failure of the adhesive layer (i.e., interlayer exfoliation).

Also, in the case of adding the vulcanization aid to the RFL treating liquid, the impregnation treatment of the fiber-woven fabric may be divided and performed twice. In this case, first, in the first RFL impregnation treatment, none of the vulcanizing aids described above is added to the RFL treating liquid. This is because, in the first treatment step, thermal curing of the RF components is prioritized over crosslinking of the rubber latex component.

On the other hand, in the second RFL impregnating treatment, used is an RFL treating liquid which contains a larger amount of a rubber latex component in comparison to the first RFL treating liquid and to which at least one vulcanization aid among an aqueous dispersion of a sulfur compound, a quinone oxime-based compound, a methacrylate-based compound, and a maleimide-based compound or one obtained by dispersing the vulcanization aid in water. Incidentally, the reason why a difference in the proportion of the rubber latex component in the RFL treating liquid is provided between the first impregnation and the second impregnation is that it is intended to enhance the adhesion of the RFL layer to both the fiber and the rubber having different affinity.

(2) Two kinds of rubber cement treatments (P1 treatment, Si treatment) are performed, in which the adhesion-treating agent composed of a rubber cement prepared by dissolving a rubber composition in a solvent is attached to the fiber-woven fabric and then a baking treatment is conducted.

(3) A rubber cement and a rolled rubber are applied on the surface of the fiber-woven fabric in this order. This step is also called a coat treatment. The term of "in this order" precisely means "from the fiber-woven fabric to the tooth part 7 in this order". Here, in the case of adding the vulcanizing aid to the RFL treating liquid, it is preferable to add the same vulcanizing aid as the one added to the RFL treating liquid to the rubber cement and the rolled rubber to be used in this coat treatment. Thereby, a remarkable improvement in adhesive force between the fiber-woven fabric treated with the RFL treating liquid and the rubber cement can be expected.

All the above treatments of (1) to (3) should not necessarily be performed and any one or a combination of two or more thereof may be performed as needed. For example, in the case of adding the vulcanization aid to the RFL treating liquid in the treatment of (1), since the adhesive force between the fiber-woven fabric and the rubber is considerably enhanced by this treatment alone, the rubber cement treatment of (2) may be omitted.

The toothed belt 3 according to the present embodiment can be prepared by a preliminary molding method. The preliminary molding method is a method as follows: first, the tooth fabric 11 and the tooth parts 7 are preliminary molded by using a mold having a tooth form to obtain a preform, then the resultant preform is wound on a mold, and the cord 9 is spirally spun thereon; then, after an unvulcanized rubber constituting the back side 4 is wound thereon, the whole is vulcanized in a vulcanizer. In the preliminary molding method, since the tooth fabric and the tooth parts are preliminarily molded before vulcanization, it is not necessary to make the unvulcanized rubber constituting the back side flow through the cords into the inside (ventral side) and make the tooth fabric tense to form the tooth parts at the time of vulcanization. Thus, it becomes possible to narrow the distance (pitch) between the cords.

EXAMPLES (Toothed Belt)

By using the following members, a toothed belt according to the present Example having a belt size of 130H14M20 (number of belt teeth: 130 teeth, tooth type: H14M, tooth part pitch: 14 mm, belt width: 20 mm) was prepared by a preliminary molding method.

In the present Example, the back side and the tooth parts were constituted by a rubber composition composed of respective H-NBR in Table 1 shown below.

TABLE 1

| Configuration of H-NBR | HNBR1 | HNBR2 | HNBR3 | HNBR4 | HNBR5 | HNBR6 |
|---|---|---|---|---|---|---|
| Hardness | 96 | 92 | 89 | 85 | 82 | 80 |
| HNBR*1 | 0 | 50 | 40 | 40 | 80 | 100 |
| Unsaturated carboxylic acid metal salt + HNBR composite polymer*2 | 100 | 50 | 60 | 60 | 20 | 0 |
| Aromatic polyamide short fiber*3 | 5 | 5 | 0 | 0 | 0 | 0 |
| Stearic acid | 0.5 | 0.5 | 1 | 1 | 1 | 1 |

TABLE 1-continued

| Configuration of H-NBR | HNBR1 | HNBR2 | HNBR3 | HNBR4 | HNBR5 | HNBR6 |
|---|---|---|---|---|---|---|
| Carbon black SRF | 2 | 2 | 50 | 40 | 40 | 40 |
| Silica | 0 | 0 | 0 | 10 | 5 | 10 |
| Zinc oxide | 5 | 0 | 0 | 0 | 0 | 0 |
| Plasticizer | 0 | 0 | 5 | 5 | 10 | 2 |
| Antiaging agent | 1.5 | 1.5 | 2 | 2 | 2 | 2 |
| Vulcanization aid | 1 | 1 | 10 | 10 | 0 | 5 |
| Organic peroxide*4 | 2 | 2 | 2 | 2 | 2 | 2 |

*1"ZETPOL2010" manufactured by Zeon Corporation: unsaturated carboxylic acid metal salt:hydrogenated acrylonitrile-butadiene rubber = 0:100; iodine value: 11 mg/100 mg
*2"ZSC2295CX" manufactured by Zeon Corporation: unsaturated carboxylic acid metal salt:hydrogenated acrylonitrile-butadiene rubber = 110:100; iodine value: 28 mg/100 mg
*3"Conex short fiber" manufactured by Teijin Limited
*41,3-bis(t-butylperoxyisopropyl)benzene In addition, as the cord, a carbon fiber of TORAYCA 12K-1/2, 12K-1/4, or 6K-1/2 manufactured by Toray Industries Inc. was used and subjected to an adhesion treatment with an H-NBR-based overcoat treating agent.

Also, a tooth fabric structure of the tooth fabric is shown in Table 2. As shown in Table 2, in the tooth fabric, not only a PTFE fiber but also a polyester-based fiber that is a low-melting-point fiber having such a melting point that it melts at the rubber vulcanization temperature are blended in the weft. The polyester-based fiber used at this time ("Korunetta" manufactured by Unitika Ltd.) has a core part melting point of 256° C. and a sheath part melting point of 160° C.

TABLE 2

| | Tooth fabric structure |
|---|---|
| Weave structure | Weft: two color, double weaving<br>Front 1/3 twill weave, Rear 2/2 twill wave |
| Weft | nylon 66 |
| Warp-1 | PTFE fiber*1 |
| | polyester fiber*2 |
| | urethane elastic yarn |
| Warp-2 | nylon 66 |
| | urethane elastic yarn |

*1PTFE fiber: TOYOFLON 1330dtox manufactured by Toray Industries Inc.
*2Polyester-based fiber: Korunetta manufactured by Unitika Ltd.

In addition, the formulation of the RFL treating liquid, the formulation of the rubber cement treatment (P1 treatment and Si treatment), and the rubber formulation for the coat treatment, to be used in the tooth fabric adhesion treatment are shown in Table 3, Table 4, and Table 5, respectively.

TABLE 3

| | RFL formulation | |
|---|---|---|
| Formulation | B-1 | B-2 |
| Hydrogenated acrylonitrile-butadiene rubber latex (40% by mass) | 100 | 100 |
| RF condensate (20% by mass) | 50 | 25 |
| Aqueous NaOH solution (10% by mass) | 0 | 2 |
| Water dispersion of maleimide-based compound (50% by mass) | 0 | 20 |
| Water | 110 | 110 |

Unit: parts by mass

TABLE 4

P1 treatment (isocyanate-containing rubber cement treatment) formulation, S1 treatment (rubber cement treatment) formulation

| Formulation | Rubber cement for P1 | Rubber cement for S1 |
|---|---|---|
| Formulation for hydrogenated acrylonitrile-butadiene rubber cement rubber | 5 | 15 |
| Polymeric MDI | 5 | 0 |
| Methyl ethyl ketone | 90 | 85 |

Unit: parts by mass

TABLE 5

| Rubber formulation for coat treatment | |
|---|---|
| Rubber formulation | C-1 |
| Hydrogenated acrylonitrile-butadiene rubber*1 | 50 |
| Hydrogenated acrylonitrile-butadiene rubber*2 | 50 |
| Zinc oxide | 2 |
| Stearic acid | 1 |
| Silica | 50 |
| Carbon black | 0 |
| Antiaging agent | 2 |
| Vulcanization aid*3 | 2 |
| Organic peroxide*4 | 2 |
| Plasticizer (ether-based) | 10 |

Unit: parts by mass
*1"ZETPOL" manufactured by Zeon Corporation
*2"ZSC" manufactured by Zeon Corporation
*3Maleimide-based compound
*41,3-bis(t-butylperoxyisopropyl)benzene In the present Example, in the preparation of the toothed belt by the preliminary molding method, first, a tooth fabric and an unvulcanized rubber sheet (thickness: 2.35 mm) to be tooth parts are put on a mold having a tooth form and pressing is conducted under the conditions of 120° C., 160 seconds, and a pressing pressure of 4.51 MPa (surface pressure) to prepare a preform. Then, the preform prepared is wound on a mold and a cord 9 is spirally spun thereon under the conditions of a spinning tension: 490 N/piece, a spinning pitch: 1.0 to 2.0 mm/piece (changed according to a rope diameter), and a spinning rate: 1.5 m/s. An unvulcanized rubber sheet (thickness: 2.0 mm) constituting a back side is wound thereon and then, the whole is vulcanized by using a vulcanizer under the conditions of a vulcanization temperature of 179° C., a vulcanization time of 40 minutes, and a vapor pressure: 0.83 MPa to prepare a toothed belt.
(Running Test Under High-Load Conditions)

Then, a running test under high-load conditions for 600 hours using a biaxial high-load running test machine illustrated in FIG. 4 was performed and thus technical effects of the toothed belt according to Examples of the present invention were verified.

[Test Conditions]

Test machine: a biaxial high-load running test machine (see FIG. 4)
Number of teeth of driving pulley: 33 teeth
Number of teeth of driven pulley: 61 teeth
Load: 900 N·m to driven pulley
Number of rotations: 1,200 rpm Toothed belts to be targets for the running test are 13 kinds of toothed belts (Examples 1 to 7 and Comparative Examples 1 to 6) prepared with the rubber formulations, tooth fabric structures, and the tooth fabric adhesion treatments shown in Tables 1 to 5 by the preliminary molding method. Each of these 13 kinds of the toothed belts was subjected to the running test under the above-described test conditions and confirmed whether the belt reached the end of life. In the case where it reached the end of life, time and failure mode were identified. The results are shown in Table 6.

TABLE 6

| Code | | Ex. 1 | Ex. 2 | Ex. 3 | Ex. 4 | Ex. 5 | Ex. 6 | Ex. 7 |
|---|---|---|---|---|---|---|---|---|
| | Fiber structure | Carbon fiber 12K-1/2 | Carbon fiber 12K-1/4 | Carbon fiber 12K-1/4 | Carbon fiber 12K-1/4 | Carbon fiber 12K-1/4 | Carbon fiber 12K-1/4 | Carbon fiber 12K-1/6 |
| | Twist manner | Lang | Lang | Lang | Lang | Lang | Lang | Lang |
| | Primary twist factor | 0.97 | 0.97 | 0.97 | 0.97 | 0.97 | 0.97 | 0.97 |
| | Final twist factor | 2.07 | 2.07 | 2.07 | 2.07 | 2.07 | 2.07 | 2.07 |
| | Cord diameter (mm) | 1.2 | 1.8 | 1.8 | 1.8 | 1.8 | 1.8 | 2.4 |
| | Tooth fabric | PTFE | PTFE | PTFE | PTFE | PTFE | PTFE | PTFE |
| | Tooth part rubber | HNBR1 | HNBR1 | HNBR1 | HNBR1 | HNBR1 | HNBR2 | HNBR1 |
| | Hardness JIS-A | 96 | 96 | 96 | 96 | 96 | 92 | 96 |
| | Back side rubber | HNBR5 | HNBR6 | HNBR5 | HNBR4 | HNBR3 | HNBR5 | HNBR5 |
| | Hardness JIS-A | 82 | 80 | 82 | 85 | 89 | 82 | 82 |
| | Life | 410 hrs. | 600 hrs. | 600 hrs. | 600 hrs. | 600 hrs. | 310 hrs. | 600 hrs. |
| | Failure mode | Tooth crack by large elongation of cord | No failure | No failure | No failure | No failure | Tooth crack by large deformation of tooth rubber | No failure |
| | Bending fatigue of belt (running residual strength) | 92% | 96% | 95% | 93% | 89% | 91% | 95% |

| Code | | Comp. 1 | Comp. 2 | Comp. 3 | Comp. 4 | Comp. 5 | Comp. 6 |
|---|---|---|---|---|---|---|---|
| | Fiber structure | Carbon fiber 6K-1/4 | Carbon fiber 12K-1/4 | Carbon fiber 12K-1/4 | Aramid fiber 1650dtex 18 pieces | Carbon fiber 12K-1/4 | Carbon fiber 12K-4/0 |
| | Twist manner | Lang | Lang | Lang | Lang | Ply | Single |
| | Primary twist factor | 0.97 | 0.97 | 0.97 | 0.56 | 0.97 | 2.89 |
| | Final twist factor | 2.07 | 2.07 | 2.07 | 1.62 | 2.07 | — |
| | Cord diameter (mm) | 1.0 | 1.8 | 1.8 | 2.0 | 1.8 | 1.8 |
| | Tooth fabric | PTFE | PTFE | PTFE | PTFE | PTFE | PTFE |
| | Tooth part rubber | HNBR1 | HNBR1 | HNBR1 | HNBR2 | HNBR1 | HNBR1 |
| | Hardness JIS-A | 96 | 96 | 96 | 92 | 96 | 96 |
| | Back side rubber | HNBR5 | HNBR2 | HNBR1 | HNBR5 | HNBR5 | HNBR5 |
| | Hardness JIS-A | 82 | 92 | 96 | 82 | 82 | 82 |
| | Life | 192 hrs. | 350 hrs. | 187 hrs. | 5 hrs. | 170 hrs. | 250 hrs. |
| | Failure mode | Tooth crack by large elongation of cord | Severance in back rubber crack by large back rubber hardness | Severance in back rubber crack by large back rubber hardness | Tooth crack by large elongation of cord | Belt severance by bending fatigue of cord | Belt severance by bending fatigue of cord |
| | Bending fatigue of belt (running residual strength) | 91% | 83% | 86% | 95% | 40% | 55% |

From the results shown in Table 6, it was found that back side cracks owing to bending fatigue were not generated in each Example and a sufficient running life was achieved in Examples 1 to 7 especially in which the cord diameter was 1.2 mm or more. Incidentally, in Example 1 in which the cord diameter is 1.2 mm and in Example 6 in which the tooth rubber hardness is 92, there is a slight decrease in running life but it is considered to be within an allowable range.

In Comparative Examples 2 and 3 in which the back side hardness is 92 or more in JIS-A hardness, the belt severance owing to the generation of the back side cracks occurred.

Moreover, in Comparative Example 4 in which the cord is an aramid fiber, tooth crack owing to cord elongation occurred in an early period.

In addition, in Comparative Example 5 in which the cord is plied one and in Comparative Examples 6 of single-twisted one, since the bending fatigue resistance is insufficient, the cord severance occurred in an early period.

(Bending Fatigue Test)

Here, as a bending fatigue test of a toothed belt under high-load conditions, using a sample obtained by cutting 30 teeth from each of 12 kinds of toothed belts before the above-mentioned running test, strength at break obtained by stretching the sample at a constant rate of 50 mm/minute was measured by using an Amsler testing machine. The strength at break was also measured in the same manner for the belts after the running test. Then, the ratio of the strength after the running test to the strength before the running test was calculated and it was taken as strength retention. Incidentally, the strength retention is running residual strength of a belt and is a value indicating the bending fatigue properties of the belt. The results are shown in the column of "Bending fatigue of belt (running residual strength)" in the above Table 6.

From the results shown in Table 6, in comparison to Comparative Examples 4 in which the cord is an aramid fiber and Comparative Examples 5 and 6 in which the cord is plied one or single-twisted one, in each of Examples 1 to 7 in which the cord is a carbon fiber and Lang-twisted one, a sufficiently high strength retention of an equal level was achieved.

(Bending Fatigue Test of Cord Alone)

Furthermore, as a bending fatigue test of a cord alone under high-load conditions, as illustrated in FIG. 5, the cord alone was wound on a pair of cylindrical rotary bars (φ30 mm) which are disposed on upper and lower with bending in an S-shape, one end of the cord was fixed to a frame, and a load of 3 kg was applied to another end. Then, a pair of the rotary bars was reciprocated vertically 100,000 times (stroke: 140 mm, cycle: 100 times/minute) while keeping at a constant relative distance therebetween, to conduct repeatedly winding and rewinding of the cord on the rotary bars, thereby imparting bending fatigue to the cord itself. A tensile test of the cord alone after the bending fatigue test was performed and, from the previously measured results of the tensile test before the bending fatigue test, the strength retention was calculated. The results are shown in Table 7. From the results shown in Table 7, it was found that the Lang-twisted cord had a high strength retention as compared to the plied or single-twisted cord. Also, it was found that the Lang-twisted cord of the carbon fiber had a high strength retention as compared to the cord of the aramid fiber.

TABLE 7

| | Carbon fiber 12K-1/4 Lang-twisted | Carbon fiber 12K-1/4 plied | Carbon fiber 12K-4/0 single-twisted | Carbon fiber 12K-1/2 Lang-twisted | Carbon fiber 6K-1/2 Lang-twisted | Aramid fiber 1650dtex 18 pieces |
|---|---|---|---|---|---|---|
| Bending fatigue properties of cord (2 bar test) | 80% | 55% | 70% | 85% | 90% | 75% |

(Bending Rigidity of Cord)

Moreover, for each of 8 kinds of cords of Examples 2 to 5 and Comparative Examples 2, 3, 5, and 6 shown in Table 6, in which the twisting way was different, bending stiffness Ec of the cord was determined by a bending test using an Olsen-type bending test machine in accordance with JIS K 7106 (1995) and the value is multiplied by the second moment of area Ic of the cord calculated from the following equation (1), thereby calculating bending rigidity EcIc of the cord from the following equation (2). Here, the size of a test piece was as follows: length: 70 mm, width: 14.4 mm (corresponding 8 pieces of the cord having a cord diameter of 1.8 mm), and thickness: 2 mm, and the distance S between supporting poles was 25.4 mm and the pendulum moment M at the load scale of 100% was 0.098N·m. In addition, the test was conducted under the conditions of a temperature of 23±2° C. and a humidity of 65±5%.

[Math. 1]

$$I_c = \pi \times d^4/64 \qquad (Equation\ 1)$$

Ic: second moment of area of cord (mm$^4$)

d: diameter of cord (mm)

[Math. 2]

$$E_c I_c = \frac{S \times M}{300} \times \frac{N}{D \times 0.01745} \qquad (Equation\ 2)$$

Ec: bending stiffness of cord(N/mm$^2$)

Ic: second moment of area of cord(mm$^4$)

S: distance between supporting points(mm)

M: pendulum moment($N \cdot m$)

D: bending angle(°)(1° = π/180 = 0.01745 radian)

N: reading (%) on load scale plate corresponding to bending angle(°)

The results are shown in the column of "Cord" in Table 8. From the results shown in Table 8, it was found that the bending rigidity of the Lang-twisted cords of Examples 2 to 5 and Comparative Examples 2 and 3 exhibited lower values than the bending rigidity of the plied cord of Comparative Example 5 and the single-twisted cord of Comparative Example 6.

TABLE 8

| | | Ex. 2 | Ex. 3 | Ex. 4 | Ex. 5 | Comp. 2 | Comp. 3 | Comp. 5 | Comp. 6 |
|---|---|---|---|---|---|---|---|---|---|
| Cord | Twist method | Lang twist (carbon fiber 12K-1/4) | | | | | | Ply twist | Single twist |
| | Bending rigidity (Nmm²) | | | 1330 | | | | 2150 | 1785 |
| Back side rubber | Hardness | 80 | 82 | 85 | 89 | 92 | 96 | 82 | 82 |
| | Bending rigidity (Nmm²) | 170 | 215 | 315 | 515 | 750 | 1230 | 215 | 215 |

(Bending Rigidity of Back Side Rubber)

Moreover, for each of 8 kinds of back side rubbers of Examples 2 to 5 and Comparative Examples 2, 3, 5, and 6 shown in Table 6, in which the hardness is different, bending stiffness Er of the back side rubber was determined by a bending test using an Olsen-type bending test machine in accordance with JIS K 7106 (1995) and the value is multiplied by the second moment of area Ir of the back side rubber calculated from the following equation (3), thereby calculating bending rigidity ErIr from the following equation (4). Here, the size of a test piece of the back side rubber was as follows: length: 70 mm, width: 25.4 mm, and thickness: 2 mm, and the distance S between supporting poles was 25.4 mm and the pendulum moment M at the load scale of 100% was 0.098N·m. In addition, the test was conducted under the conditions of a temperature of 23±2° C. and a humidity of 65±5%.

[Math. 3]

$$I_r = b \times h^3 / 12 \quad \text{(Equation 3)}$$

Ir: second moment of area of test piece (mm⁴)
b: width of test piece (mm)
h: thickness of test piece (mm)

[Math. 4]

$$E_r I_r = \frac{S \times M}{300} \times \frac{N}{D \times 0.01745} \quad \text{(Equation 4)}$$

Ec: bending stiffness of test piece(N/mm²)
Ic: second moment of area of test piece(mm⁴)
S: distance between supporting points(mm)
M: pendulum moment(N·m)
D: bending angle(°)(1° = π/180 = 0.01745 radian)
N: reading (%) on load scale
plate corresponding to bending angle(°)

The results are shown in the column of "Back side rubber" in Table 8. From the results shown in Table 8, it was found that a back side rubber having lower hardness exhibited a lower value of the bending rigidity. Also, it was found that the bending rigidity of the back side rubber is suitably from 100 to 600 N/mm².

(Consideration)

From the tests described above, the following was revealed.

It was revealed that a carbon fiber cord is suitable for the cord of the toothed belt in order to exhibit an excellent bending fatigue resistance even under high-load conditions. That is, this is because, in Comparative Example 4 in which an aramid fiber cord is used, the cord is elongated during the running and, as a result, tooth crack of the toothed belt occurs (see Comparative Example 4 in Table 6). Also, from the results shown in Table 7, an excellent bending fatigue resistance was confirmed in the carbon fiber cords as compared to the aramid fiber cord.

It was revealed that, as the cord of the toothed belt, Lang-twisted one is suitable than plied or single-twisted one in order to exhibit an excellent bending fatigue resistance even under high-load conditions (see Tables 6 to 8). That is, from the results shown in Table 6, in comparison to Comparative Examples 5 and 6 in which the cord is plied or single-twisted one, a sufficiently high strength retention of an equal or higher level was achieved in each of Examples 1 to 7 in which the cord is Lang-twisted one. Also, from the results shown in Table 7 and Table 8, an excellent bending fatigue resistance was confirmed in the Lang-twisted cords as compared to the plied or single-twisted cord.

As a result of comparing Example 3 and Comparative Examples 5 and 6, in the toothed belts of Comparative Examples 5 and 6, the belt had been severed due to cord bending fatigue at the running time of 170 and 250 hours, respectively, but, the toothed belt of Example 3 had completed the running test and also exhibited good running residual strength (see Table 6). It is considered that this is because the Lang-twisted cord used in Example 3 has a lower value of bending rigidity than that of the plied or single-twisted cord used in Comparative Examples 5 and 6 and is excellent in bending fatigue resistance (see the column of "Cord" in Table 8).

Moreover, it was revealed that the cord diameter of the cord of the toothed belt is suitably 1.1 mm or more and 2.5 mm or less in order to exhibit an excellent bending fatigue resistance even under high-load conditions. That is, as a result of comparing Examples 1 and 3 and Comparative Example 1 (see Table 6), in Comparative Example 1 in which the cord diameter is 1.0 mm, the cord has been elongated during the running test for a short period of time and, as a result, tooth crack of the toothed belt occurs. On the other hand, in Example 1 in which the cord diameter is 1.2 mm, the cord was elongated during running and a slight decrease in running life was observed but, since the belt had run for 410 hours, which was practically within an allowable range, and the running residual strength was good. In Example 3 in which the cord diameter is 1.8 mm, the belt had completed the running test and the running residual strength was also good. Furthermore, based on Example 1 in which the cord diameters is 1.2 mm and Comparative Example 1 in which the cord diameter is 1.0 mm, in the case where the cord diameter is 1.1 mm, the running life is expected to be about 300 hours, which is considered to be within an allowable range. Therefore, it is assumed that a sufficient running life can be obtained when the cord diameter is 1.1 mm or more. Furthermore, based on Example 7 in which the cord diameter is 2.4 mm, a long running life of near to 600 hours is expected even in the case where the cord diameter is 2.5 mm. Therefore, in order to prevent a decrease in the bending fatigue resistance of the cord, the cord diameter is preferably 2.5 mm or less. From the above, it is revealed that the cord diameter is suitably 1.1 mm or more and 2.5 mm or less.

Moreover, it was revealed that the JIS-A hardness of the back side rubber of the toothed belt is suitably from 80 degrees to 89 degrees in order to exhibit an excellent bending fatigue resistance even under high-load conditions. That is, as a result of comparing Examples 2 to 5 and Comparative Examples 2 and 3, in the belts of Comparative Examples 2 and 3 in which a rubber having a JIS-A hardness of 92 degrees or 96 degrees was used as the back side rubber, the back side rubber of the toothed belt was cracked and severed at the time of 350 and 187 hours, respectively during the running test, but the toothed belts of Examples 2 to 5 in which a rubber having a JIS-A hardness of 80 degrees to 89 degrees was used as the back side rubber had completed the running test and the running residual strength was also good (see Table 6). It is considered that this is because the rubbers having a low hardness, which were used in Examples 2 to 5, have low values of the bending rigidity than those of the rubbers having a high hardness, which were used in Comparative Examples 2 and 3, and are excellent in bending fatigue resistance (see the column of "Back side rubber" in Table 8).

Moreover, it was revealed that the JIS-A hardness of the tooth part rubber of the toothed belt is suitably from 92 degrees to 96 degrees in order to exhibit an excellent bending fatigue resistance even under high-load conditions. That is, this is because, in the case where a rubber having a JIS-A hardness of less than 92 degrees is used as the tooth part rubber, there is a possibility that the tooth part rubber may be chipped during the running test for a short period of time since the rubber is too soft. In the toothed belts of Examples 1 to 7 in which rubbers having a JIS-A hardness of from 92 degrees to 96 degrees were used as the tooth part rubbers, the life during the running test was long and the running residual strength was also good (see Table 6). Incidentally, as for Example 6 in which a rubber having a JIS-A hardness of 92 degrees was used as the tooth part rubber, a tooth was chipped during running and a slight decrease in the running life was observed but, the belt had run for 310 hours, which was practically within an allowable range and the running residual strength was also good. In Example 3 in which a rubber having a JIS-A hardness of 96 degrees was used as the tooth part rubber, the belt had completed the running test and the running residual strength was also good.

From the above, it was revealed that the belts prepared by using a Lang-twisted carbon fiber having a cord diameter of 1.1 mm or more and 2.5 mm or less as a cord, using a rubber having a relatively low hardness and a JIS-A hardness of from 80 degrees to 89 degrees as a back side rubber, and using a rubber having a relatively high hardness and a JIS-A hardness of from 92 degrees to 96 degrees as a tooth part rubber have such a high durability that an excellent bending fatigue resistance is exhibited even under high-load conditions and thus are suitable in high-load transmission applications.

Embodiments of the present invention have been described above based on the drawings but specific configurations should not be construed as being limited to these embodiments and examples. The scope of the present invention is shown by not only the description of the embodiments and Examples mentioned above but also Claims, and all changes within meanings and scopes equivalent to Claims are included therein.

The present application is based on Japanese Patent Application No. 2013-179391 filed on Aug. 30, 2013 and Japanese Patent Application No. 2014-162892 filed on Aug. 8, 2014, and the contents thereof are incorporated herein by reference.

INDUSTRIAL APPLICABILITY

By utilizing the present invention, it is possible to obtain a highly durable toothed belt exhibiting an excellent bending fatigue resistance even under high-load conditions.

DESCRIPTION OF REFERENCE NUMERALS AND SIGNS

3: Toothed belt
4: Back side
5: Short fiber
6: Warp
7: Tooth part
8: Weft
9: Cord
11: Tooth fabric

The invention claimed is:

1. A toothed belt comprising:
a plurality of tooth parts that are disposed at predetermined intervals along a longitudinal direction and comprise a rubber composition (A) as a base material, and
a back side that has a cord embedded therein and comprises a rubber composition (B) as a base material,
wherein the cord comprises a Lang-twisted carbon fiber and is formed in a diameter of 1.1 mm or more and 2.5 mm or less,
wherein the rubber composition (B) constituting the back side has a hardness of from 80 degrees to 89 degrees in JIS-A hardness,
wherein the rubber composition (A) constituting the tooth parts has a hardness of from 92 degrees to 96 degrees in JIS-A hardness, and
wherein the hardness of the rubber composition (A) constituting the tooth parts is different from the hardness of the rubber composition (B) constituting the back side, and
wherein the bending rigidity of the back side is from 100 to 600 N/mm$^2$.

2. The toothed belt according to claim 1, wherein a difference between the hardness of the rubber composition (A) constituting the tooth parts and the hardness of the rubber composition (B) constituting the back side is from 7 degrees to 16 degrees in JIS-A hardness.

3. The toothed belt according to claim 1, wherein both of the rubber composition (A) constituting the tooth parts and the rubber composition (B) constituting the back side comprise a hydrogenated acrylonitrile-butadiene rubber and an unsaturated carboxylic acid metal salt.

4. The toothed belt according to claim 1, wherein the rubber composition (B) constituting the back side comprises a hydrogenated acrylonitrile-butadiene rubber and an unsaturated carboxylic acid metal salt in a mass ratio of from 68.6:31.4 to 100:0.

5. The toothed belt according to claim 1, wherein the rubber composition (A) constituting the tooth parts comprises a hydrogenated acrylonitrile-butadiene rubber and an unsaturated carboxylic acid metal salt in a mass ratio of from 73.8:26.2 to 47.6:52.4.

6. The toothed belt according to claim 3, wherein the rubber composition (A) constituting the tooth parts comprises a short fiber in an amount of from 3 to 7 parts by mass based on 100 parts by mass of a total amount of a rubber component comprising the hydrogenated acrylonitrile-butadiene rubber and the unsaturated carboxylic acid metal salt.

7. The toothed belt according to claim 1, wherein the tooth parts have a tooth pitch of from 8 mm to 14 mm.

8. The toothed belt according to claim 1, wherein the hardness of the rubber composition (B) constituting the back side is from 80 degrees to 82 degrees.

9. The toothed belt according to claim 1, wherein the Lang-twisted carbon fiber has a primary twist factor ranging from 0.65 to 1.61.

10. The toothed belt according to claim 1, wherein the rubber composition (A) constituting the tooth parts has an E' of from 200 to 300 MPa under an atmospheric temperature of 70° C. as measured according to JIS K6394 (2007) and a loss factor (Tan δ) ranging from 0.1 to 0.2.

\* \* \* \* \*